United States Patent Office 3,038,915
Patented June 12, 1962

3,038,915
COMPOUNDS OF A GROUP IV–A METAL DIRECTLY BONDED TO ONE AND ONLY ONE CYCLOPENTADIENYL NUCLEUS AND TO ANIONS
Archie E. Barkdoll, Hockessin, and John C. Lorenz, Wilmington, Del., assignors to E. I. du Pont de Nemours and Company, Wilmington, Del., a corporation of Delaware
No Drawing. Filed Oct. 5, 1953, Ser. No. 384,312
1 Claim. (Cl. 260—429.5)

This invention relates to organometallic derivatives of group IV–A metals. More particularly, this invention relates to new organometallic derivatives of group IV–A metals which contain bonded to the metal atom an unsaturated carbocyclic hydrocarbon radical and methods for their preparation.

Organometallic compounds, i.e., compounds wherein the metal atom is bonded directly to carbon of organic radicals, have found utility in catalytic and synthetic processes. For example, tetraethyllead is used as an antiknock agent in spark ignition engines; organomercury compounds are used in the fungicide field, particularly as seed disinfectants; and organomagnesium, organosodium and organolithium compounds are used in organic syntheses.

Recently there has been disclosed a compound having two cyclopentadienyl radicals directly attached to an iron atom as described by Kealy and Pauson, Nature 168, 1039 (1951), and claimed by Pauson in U.S. patent application Serial No. 291,567, filed June 5, 1952, now U.S. Patent No. 2,680,756, issued June 8, 1954. This compound has been considered unique in that, according to Wilkinson et al. in J. Am. Chem. Soc. 74, 2125 (1952), all five positions of each cyclopentadiene ring in dicyclopentadienyl metallics are equivalent and no isomerism with respect to any one cyclopentadiene ring is possible. Other group VIII organometallics of cyclopentadiene have been reported. For example, the cobalt compound has been prepared by Wilkinson, J. Am. Chem. Soc. 74, 6146–9 (1952), and the nickel derivative is the subject of U.S. patent application to Thomas, Serial No. 298,170, filed July 10, 1952, now U.S. Patent No. 2,680,758, issued June 8, 1954.

In these organometallic compounds of the group VIII elements, there are two cyclopentadienyl radicals directly linked through carbon thereof to the metal atom. Many investigators have attempted to explain the unusual stability of these compounds as due not only to the particular type of organic radicals bonded to the metal, but also to the fact that there are two radicals so linked. Fundamental physical studies, such as ultraviolet, X-ray, infrared, and other investigations capable of defining the molecular geometry of the compound, have all shown that there are linked to the metal atom two cyclopentadienyl nuclei, in which all carbons are identically bonded, and that the structure of the overall molecule is similar to that of a sandwich wherein the planes of the two cyclopentadiene rings are essentially parallel to each other with the iron atom equidistant therebetween (see, for instance, Wilkinson et al., J. Am. Chem. Soc. 74, 2125 (1952), Woodward et al., ibid, 3458, Eiland et al., ibid, 4971, Fischer et al., Z. f. Naturf. 7b, 377 (1952), and Dunitz et al., Nature 171, 121 (1953)). These various authors furthermore conclude that the peculiar aromatic nature of the cyclopentadiene rings, rather than the expected polyolefinic behavior, is similarly a result of this unique molecular sandwich structure.

In view of the general utility of the known organometallics, much effort has been expended on preparation of organic derivatives of other metals. Gilman, "Organic Chemistry," John Wiley, New York, second edition (1943), page 557, states that "Numerous attempts have been made to prepare organotitanium and organozirconium compounds, but without unequivocal success. Titanium and zirconium chloride are reduced to lower halides and possibly to the metals in reactions with RMgX and RLi compounds." Recently, group IV–A organometallic derivatives have been prepared where the titanium, zirconium, or hafnium is attached to two cyclopentadiene rings. The fact that such compounds exist (see Thomas and Whitman U.S. patent application, filed June 15, 1953, Serial No. 361,820), lends further support to the assumption that two cyclopentadiene rings are required to provide stable cyclopentadienyl organometallic compounds.

It is an object of this invention to provide a new class of organometallic compounds and methods for their preparation. A further object is to provide new organometallic compounds of group IV–A metals which contain bonded to the metal atom one and only one unsaturated carbocyclic organic radical. A still further object is to provide monocyclopentadienyltitanium, monocyclopentadienylzirconium and monocyclopentadienylhafnium compounds. Other objects will appear hereinafter.

These and other objects of this invention are accomplished by providing group IV–A metal derivatives in which the metal has an atomic number of at least 22 and of not more than 72 and in which the metal atom is bonded directly to nuclear carbon of one and only one carbocyclic organic radical, with the remaining valences of the metal bonded to anions. In a preferred embodiment these organometallic compounds are molecules whose cation portion is a carbocyclic radical of five ring carbons having two nuclear conjugated ethylenic unsaturations, the carbocyclic radical being attached to the metal through nuclear carbon, and the anion portion is inorganic. The group IV–A metals having an atomic number of at least 22 and of not more than 72 are titanium, zirconium and hafnium as shown by the periodic table on page 28 of "Organic Chemistry" by Fritz Ephraim, third English edition, published by Nordeman Publishing Company, Inc., New York, 1939.

These group IV–A metal derivatives are generally obtained by reacting a halogen, under anhydrous conditions, with a dihalide of a group IV–A metal of atomic number 22 through 72, e.g., titanium- or zirconium-difluoride, chloride, or bromide, which also has attached to the metal two of the cyclic organic radicals, such as the cyclopentadienyl radical.

The preferred reaction is carried out under anhydrous conditions within the temperature range of −25° C. to 125° C., generally between 0° C. and 75° C. in an inert, liquid, anhydrous medium, such as the halogenated aliphatic solvents, particularly the chlorinated methanes. The new organometallic products formed can be removed by crystallization, removal of solvent or organic diluent, or by sublimation to provide new compounds which have one cyclic organic radical directly attached to a group IV–A metal of atomic number 22 through 72.

The preferred new compounds are represented by the formula $RMX_3$ wherein R is a carbocyclic, monovalent, organic radical which is directly bonded through ring carbon to the metal M, M is a group IV–A metal of atomic number 22 through 72 and X is an anion, preferably halogen.

The following examples in which the parts are by weight illustrate specific embodiments of the preparation of the new compounds of this invention.

EXAMPLE I

*Cyclopentadienyltitanium Bromide Dichloride*

To a suspension of 10 parts of dicyclopentadienyltitanium dichloride in 160 parts of carbon tetrachloride was added dropwise 19.2 parts of bromine while the mixture was being heated at reflux. The color of the bromine was gradually discharged and heating was continued until a clear orange solution resulted (4–5 hours). When the solution was allowed to cool, it slowly deposited a precipitate of orange crystals which were removed by filtration and dried in a vacuum desiccator over phosphorus pentoxide. A small second crop of orange crystals was obtained by partial evaporation and cooling of the filtrate. The total crude product weighed 9.7 parts (92% of theoretical) and contained some material resulting from hydrolysis of the trihalide by atmospheric moisture although all operations were carried out in a manner which minimized exposure to atmospheric moisture.

The first product (cyclopentadienyltitanium bromide dichloride) was purified and separated from the hydrolysis product by sublimation in a vacuum at 120°/0.2 mm. The purified product melted in the range 145–150° C. on an open block but slow formation of a new solid phase (by hydrolysis) was evident during the determination.

*Analysis.*—Calcd. for $C_5H_5TiBrCl_2$: C, 22.76; H, 1.90; Ti, 18.12; Cl, 26.87; Br, 30.32; M.W., 264. Found: C, 22.30; H, 1.95; Ti, 21.8; Cl, 27.20; Br, 26.45 M.W. 259, 267.

The carbon tetrachloride filtrate from the second crop of orange crystals was distilled at atmospheric pressure to remove the solvent and then under reduced pressure (20 mm.). A small amount of yellow oil was obtained but when crystals began forming in the condenser, distillation was discontinued. The dark semisolid residue was extracted with petroleum ether and recrystallized from petroleum ether and gave upon sublimation a small amount (0.2–0.3 part) of white crystals of tribromocyclopentene (M.P. 65–67° C.). The solid residue from the petroleum ether extraction gave a similar small amount of pentabromocyclopentane melting at 105–106° C. which was identified by analysis.

EXAMPLE II

Cyclopentadienyltitanium Trichloride

Chlorine gas was passed slowly into a refluxing suspension of 10 parts of dicyclopentadienyltitanium dichloride in 266 parts of methylene chloride for about two hours until a clear orange solution resulted. The methylene chloride was evaporated by a water pump to give a residue of bright orange crystals in a small amount of high boiling liquid. The residue was extracted with about 125 parts of boiling carbon disulfide and the carbon disulfide solution was decanted from the undissolved crystals. The solid was dried in a vacuum desiccator and the carbon disulfide filtrate when allowed to stand in the cold room overnight deposited an additional portion of orange crystals. These were removed by filtration and combined with the first crop to give a total of 7.0 parts (80%) of cyclopentadienyltitanium trichloride, which was purified by sublimation at 120°/0.2 mm. to give 5.5 parts of pure compound (M.P. 137–140° C.).

*Analysis.*—Calcd. for $C_5H_5TiCl_3$: C, 27.36; H, 2.28; Cl, 48.89; Ti, 21.87. Found: C, 27.74, 28.08; H, 2.45, 2.53; Cl, 47.95, 48.13; Ti, 21.14.

The carbon disulfide filtrate was distilled under vacuum, first to remove the solvent and then to obtain 4.74 parts of a yellow oil (B.P. 75–100° C./20 mm.) which was redistilled twice to obtain a colorless fraction (B.P. 81–88° C./20 mm.) identified as trichlorocyclopentene.

EXAMPLE III

Cyclopentadienyltitanium Trichloride

Butyl magnesium chloride was prepared in the usual manner from 2.5 parts of magnesium and 9.5 parts of butyl chloride in 18 parts of benzene and 24 parts of ether. To the solution of the Grignard reagent was added slowly a solution of 6.75 parts of cyclopentadiene in 16 parts of benzene and the mixture was heated at reflux until gas evolution ceased. The suspension of cyclopentadienylmagnesium chloride was then added slowly to a cold (partially frozen) solution of 19 parts of titanium tetrachloride in 50 parts of benzene. In this reaction the amount of titanium tetrahalide was equivalent on a molar basis to cyclopentadienylmagnesium halide. Heat was evolved and an ice bath was applied intermittently to keep the temperature from rising above 50° C. The mixture was stirred for one-half hour after addition of all the Grignard reagent and allowed to come to room temperature. It was filtered in a nitrogen filled dry box to remove the precipitated magnesium salts and dicyclopentadienyltitanium dichloride. The solid residue was added to a mixture of hydrochloric acid and ice to dissolve the magnesium salts and filtered to obtain 5.4 parts of dicyclopentadienyltitanium dichloride.

The dark filtrate was evaporated to dryness at the water pump (warmed on steam bath) and the dark residue was heated under vacuum on a water bath to remove unreacted titanium tetrachloride. A cold finger was then inserted into the flask and the cyclopentadienyltitanium trichloride was collected as it sublimed out of the mixture. A total of 3.7 parts of product was thus collected. It was resublimed at 100° C./0.2 mm. and identity with the product prepared in Example II was shown by infrared analysis.

The dicyclopentadienyltitanium dihalide as employed in the first two examples was prepared in the following manner:

Cyclopentadienylmagnesium chloride was prepared in the usual manner from 114.7 parts of magnesium turnings, 463 parts of n-butyl chloride in 240 parts of benzene and 800 parts of anhydrous ether, and 330 parts of cyclopentadiene in 280 parts of benzene. To this mixture was added a solution of 448 parts of titanium tetrachloride in 1200 parts of benzene over a period of 2⅓ hours at 15–23° C. with stirring. The titanium tetrahalide thus employed was present in a molar ratio of one-half of that of the cyclopentadienylmagnesium halide. The mixture was allowed to stand overnight and was filtered.

The crude red solid was washed with 1000 parts of benzene and air-dried. It was added in portions with stirring to a mixture of 1300 parts of concentrated hydrochloric acid, 2000 parts of water, and 4000 parts of cracked ice. The mixture was allowed to stand for 30 minutes and filtered. The solid was washed with 1000 parts of water and air-dried. There was thus obtained 494.7 parts of a red solid. An additional 34 parts of crude product was obtained from the combined filtrate and washings by extraction with methylene chloride.

From the 528.7 parts of crude product, 276.6 parts were separated by extraction with 12,500 parts of methylene chloride at room temperature and evaporation of the extracts to dryness. Recrystallization of 1000 parts of this material from about 3000 parts of chlorobenzene yielded 80 parts of pure dicyclopentadienyltitanium dichloride.

When zirconium tetrachloride was employed in place of the titanium tetrachloride in the above procedure, dicyclopentadienylzirconium dichloride was obtained. The use of titanium tetrafluoride for the tetrachloride gives dicyclopentadienyltitanium difluoride. (The preparation of the dihalides are further described in Thomas and Whitman U.S. patent application Ser. No. 361,820, filed June 15, 1953.)

It will be understood that the above examples are merely illustrative, and that the invention broadly comprises organometallic compounds in which a group IV–A metal (titanium, zirconium, or hafnium) is directly bonded to nuclear or ring carbon of one and only one carbocyclic organic radical and the three remaining valences of the metal are satisfied by anions, particularly inorganic anions. Although the cyclopentadienyl radical is particularly suited for reasons of availability and reactivity, this invention is not limited to such compounds containing this particular radical.

This invention likewise embraces compounds as aforesaid described where the single carbocyclic monovalent organic radical is that of substituted cyclopentadienes, e.g., 1,3-diphenylcyclopentadiene and 1,3-dimethylcyclopentadiene as well as polycyclic compounds, such as indene, 3-phenylindene, 1,3-dimethylindene, and 6-methoxy-2-phenyl-3-methylindene.

All such substituted cyclopentadienes and particularly the hydrocarbons, are useful in the preparation of the new organometallic compounds of this invention. Of these, the most useful are those which have at least one five-membered carbocyclic ring containing two nuclear ethylenic linkages. It is generally preferred that the compounds employed have substituents on no more than four of the nuclear carbons, although from a theoretical viewpoint, the number of substituents on the nuclear atoms can be as high as the number of such nuclear carbons.

The compounds thus embraced by this invention have a group IV–A metal bonded directly to carbon of one and only one carbocyclic organic radical, such as the cyclopentadienyl radical, and have the remaining valences of the metal bonded to acid anions, preferably inorganic anions, such as halogen. The anions, however, include sulfate, nitrate, phosphate, sulfite, chlorate, bromate, etc., in addition to the various halides, i.e., fluoride, chloride, bromide, and iodide. Through conventional ionic inorganic reactions, one species of anions can be substituted for another, e.g., reaction of silver sulfate with cyclopentadienyltitanium trichloride will give the corresponding sulfate. In place of the above inorganic anions, organic anions can be present, e.g., acetate, formate, and trichloroacetate.

The compounds of this invention include ethylcyclopentadienylzirconium trichloride, cyclohexylcyclopentadienyltitanium triacetate, cyclopentadienylhafnium tribromide, phenylindenyltitanium trinitrate, cyclopentadienyltitanium chloride difluoride, cyclopentadienyltitanium difluoride iodide, and the like. These compounds are represented by the formula R—M—X₂Z where R is the carbocyclic, monovalent, organic radical, M is the group IV–A metal of atomic number 22 through 72 (i.e., titanium, zirconium, or hafnium) and X and Z are anions, preferably halogen, the total valence of the anions attached to the metal being 3.

The preferred process for the preparation of the new compounds of this invention is by direct action of a halogen on a compound R₂MX₂ wherein R is a carbocyclic organic radical as defined heretofore and X is a halogen. In the halogenation, it is surprising that the cyclic organic radical which remains attached to the metal is not halogenated. The halogenation is carried out under anhydrous conditions in the presence of an inert solvent, preferably halogenated hydrocarbons, particularly halogenated methanes, at a temperature of generally 0–100° C. and preferably 30–80° C. The reaction time is generally within the range of an hour to 10 hours. The desired product of this reaction is usually removed and purified by crystallization.

A less preferred process for the production of trihalides involves the reaction of a Grignard reagent of the cyclic organic compound with large amounts of a group IV–A metal tetrahalide, e.g., the reaction of Example III, whereby cyclopentadienylmagnesium chloride is reacted with at least molar amounts of a titanium tetrahalide.

The compounds of this invention, RMX₃, react with water to give oxygen containing hydrolysis products as shown by the following experiment.

A carefully weighed sample of 1.235 parts of cyclopentadienyltitanium trichloride was ground in a mortar with 50 parts of water. The mixture was filtered and the mortar and solid were carefully washed with distilled water. After addition of 50 parts of 0.1003 N sodium hydroxide to the filtrate, the total was diluted to 1000 parts in a flask and three 30 part aliquot portions each required 2.1 parts of 0.1003 N sodium hydroxide to reach a phenolphthalein end point. The sodium hydroxide required indicated two moles of acid per mole of titanium were produced in the hydrolysis of the trihalide. The solid hydrolysis product was recrystallized from chlorobenzene.

*Analysis.*—Calcd. for (C₅H₅TiOCl)₃: C, 36.70; H, 3.07; Ti, 28.81; Cl, 21.65; M.W. 490.8. Found: C, 37.16; 37.28; H, 3.24, 3.12; Ti, 27.99; Cl, 21.50, 21.63; M.W. 445, 467.

A hydrolysis product (dec. 275–80° C.) similar to that characterized above was obtained by reaction of water with cyclopentadienyltitanium bromide dichloride. Analysis indicated that it contained the units C₅H₅TiOBr and C₅H₅TiOCl.

The products of this invention are useful in catalytic applications, for example, oxidation reactions. They are also useful as additives to motor fuels, e.g., as antiknock agents.

As many apparently widely different embodiments of this invention may be made without departing from the spirit and scope thereof, it is to be understood that this invention is not limited to the specific embodiments thereof except as defined in the appended claim.

We claim:
Organo metal compounds of the general formula selected from the group consisting of

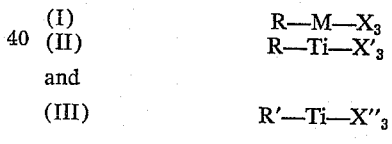

(I)   R—M—X₃
(II)  R—Ti—X′₃
and
(III) R′—Ti—X″₃ where R is a radical selected from the group consisting of indenyl, phenylindenyl, 1,3-dimethylindenyl, 6-methoxy-2-phenyl-3-methylindenyl, cyclopentadienyl, 1,3-diphenylcyclopentadienyl, 1,3-dimethylcyclopentadienyl, ethylcyclopentadienyl, and cyclohexylcyclopentadienyl radicals; R′ is a radical selected from the group consisting of phenylindenyl, 1,3 - dimethylindenyl, 6 - methoxy - 2 - phenyl - 3 - methylindenyl, 1,3 - diphenylcyclopentadienyl, 1,3-dimethylcyclopentadienyl, ethylcyclopentadienyl, and cyclohexlcyclopentadienyl radicals; M is a metal selected from the group consisting of zirconium and hafnium; X is an anion selected from the group consisting of fluoride, chloride, bromide, iodide, sulfate, nitrate, phosphate, sulfite, chlorate, bromate, acetate, formate, and trichloroacetate; X′ is an anion selected from the group consisting of sulfate, nitrate, phosphate, sulfite, chlorate, bromate, acetate, formate, and trichloroacetate; and X″ is an anion selected from the group consisting of fluoride, chloride, bromide, and iodide.

References Cited in the file of this patent

Journal of the American Chemical Society, vol. 75, pp. 3877–3887, August 20, 1953, vol. 75, p. 1011, February 20, 1953.